8109X
J. Thomas.
Floating Dock.
No.
Patented Mar. 20, 1834.
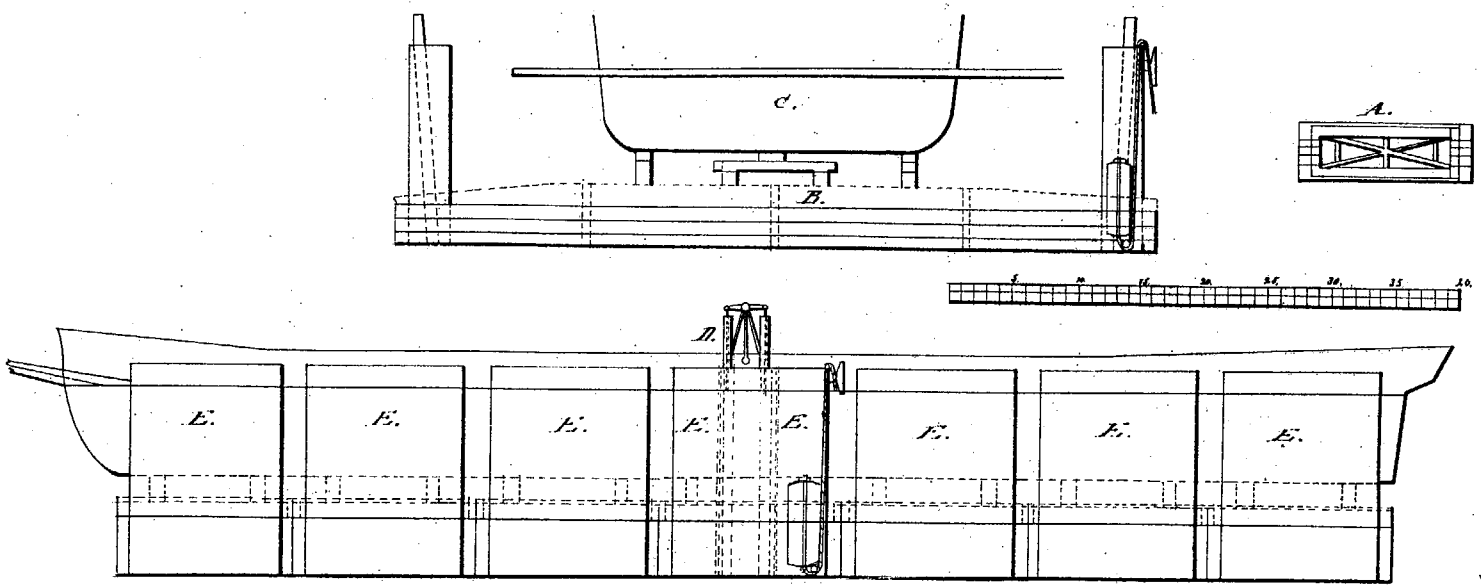
N. PETERS, PHOTO-LITHOGRAPHER, WASHINGTON, D. C.

John Thomas.

8109X

Letters Patent.

The Schedule, referred to in these Letters Patent and making part of the same, containing a description in the words of the said John Thomas himself of his improvement in the Floating Dry Dock for repairing Steam Boats and other vessels which invention he has assigned in due form of law to James H. Peck, William Thomas, Robert Wash, and John D Coalter, all of the State of Missouri, which assignment is record=ed in the Patent Office, in the Book of transfers, Vol. 5. from page 87 to page 98.

The Floating Dry Dock as it is improved by the said inven=tions of the said Thomas, will be hereinafter called the impro=ved Floating Dry dock.– It is intended to float in and upon the water– It is capable of being sunk and suspended with its deck at any depth beneath the surface of the water, which may be necessary for the purpose of admitting the vessel which is to be repaired whilst it is drawing its full draft of water to be floated over the cradle on which it is to be raised, and which is constructed on the deck of the dock– it is then capable when the vessel shall have been floated over its cradle of being made to rise, and take her with accuracy upon the cradle, and to continue to rise slowly until its deck shall appear above the water as high as may be necessary to preserve it dry, and to bear and sustain the vessel which is on its cradle as far above the deck of the dock as shall be necessary for all the purposes of making repairs upon her with convenience. The vessel which is to be repaired may be in this manner raised and sustained upon the impro=ved floating dry dock without being in danger of being strained or in=jured and will be exposed, on every part of her external surface to the

81097 whether bottom, sides or ends, to light and to the action of the air. This improved Floating Dry Dock, may be composed of one or more floats. To describe the said new and useful improvements and the manner of using the same, in terms so full clear and exact as to distinguish them from all other things before known; and to enable any person skilled in the art to which they relate, or of which they are branches or with which they are most nearly connected to make and use the same and to explain fully the principles of said inventions and the several modes in which the said Thomas has contemplated the application of those principles by which they and the character of those inventions may be distinguished from all others, I will describe the improved floating dock in one of its forms and proportions, and the manner in which it is constructed, and point out as they may be contained therein, and describe as they may be illustrated therefrom, the said new and useful improvements and the manner of making and using the same. The one he will describe shall be composed of nine floats. Each of these floats, has sides, ends, a bottom and a flush deck, and on its extreme surface is about sixty two feet in length, about fourteen feet in breadth and about four feet six inches in depth. This depth being the length of a line drawn perpendicularly between the external surfaces of its deck and bottom. Each of the sides and ends of each float, has externally a perpendicular plane surface, the bottom and also the deck of each float has externally a horizontal plane surface. The sides of each flo[illegible] are parallel to each other. The ends of each float are at right angles with the sides. The floats as they form the dock are all ranged together side to side and fastened to each other their ends form the sides of the dock. The dock is thus made to form a rectangular parallelogram the longer lines of which are at right angles with the longer lines of the parallelogram formed by each float. The deck of the dock is formed by the decks of the floats. The walls of of the dock, or that which is constructed on the dock for the pur-
pose of holding the vessel, which is to be repaired, suffi=
ciently above the deck of the dock for the repairs to be made
with convenience, is in detached parts and is distributed in-
equally to the decks of the several floats. Each float has a
trunk on each of its ends which rises about twelve feet above
the deck and is on its external surface about twelve feet in
width on two of its parallel sides by about three feet on its
other two sides, the broader sides of the trunk are at right
angles with its narrower sides, and are parallel to the ends of
the floats, and extend across its interior. The interior of each
float is divided into four chambers nearly equal in size, by
partitions or bulk heads, which partitions are perpendicular and are
at right angles with the longer sides of the float. The interior of each
trunk is divided into three apartments by perpendicular partitions at
right angles with the broader sides of the trunk which apartments will
be denominated wells. The centre apartment of each trunk will be called
the pump wells. Each of the float wells in the interior is about two
feet nine inches square in the clear. The interior of each trunk on
that side nearest the end of the float, is on the same perpendicular plane
with the inner side of the end timbers of the float. There are two com-
mon pendulum pumps fourteen feet and a half in length in each
pump well, by which the water is to be drawn from chambers of
the floats when the dock is to be raised. There is in each float well
what will be denominated a well float, which on its external
surface is two feet seven inches square by six feet in length.
This well float is made light to give it great buoyancy in the wa-
19 The sides of each one of the nine floats is twelve inches thick made
20 of solid timbers. Their ends and also the narrower sides of each trunk
is six inches thick of solid timbers. The timbers of each side of each
float, are strongly fastened together by strong iron bolts three
quarters of an inch square which are driven through one piece
of timber, and into the one next below it to the depth of about
one ten inches in two rows long from end to end of the side tim=
bers and within about one fourth part of the thickness of
the sides from the outside of these timbers and within
about one third part of their thickness from the inside of them
The outside bolts are driven within about four feet of
each other, the inside bolts within about eight feet of each
other. Those towards the outside being driven at about an
angle of eighteen degrees from a perpendicular line point=
ing neither towards the inside nor towards the outside
of the timbers, but alternately towards each end of the float, so that
in their relation to each other they form a sort of dovetail for the purpose
of giving strength to these fastenings: those towards the inner side of the tim
bers, are driven alternately with the same inclination and for
the same purpose. The timbers of each end of each float are in
fastened to each other with like bolts, driven in like manner in
in reference to their inclination and their distances from each
other - and their depth into the nether timber into which the bolt
passes. The bolts in the end timbers are driven on each side within
one third part of the thickness of the end timbers, of the edges of these
timbers. Each of the narrower sides of the trunk is a solid piece of
timber. The deck and bottom of each float and also the partitions
of the interior of each float are two inches in thickness.
No partition obstructs the communication between the walls of
the trunks and the chambers of the floats: The timbers of the ends
of each float are strongly united to the timbers of the sides at each
corner of the float by a rabbit joint, the rabbit of which is cut ex=
clusiv[illegible] in the timbers of the sides. This rabbit being six inches
each way, that is, in width and depth - and by iron bolts of the
dimensions mentioned driven horizontally through the timbers
of the ends into the timbers of the sides and also through the
timbers of the sides, into the timbers of the ends, in such manner,
that the bolts as they near each other will make an angle towards
the interior of the float of about one hundred and six degrees.
The The bottom planks of each float are let into the side and end
timbers of the float by rabbits two inches in width and depth.
the lapping of the plank in these joints is two inches. The planks of
the deck of each float are let into the timbers of the sides by a rabbit
three inches in depth by two in width; so that the lapping of the plank
in these rabbits is the same with that of the bottom. The depth of these
rabbits is for the purpose of protecting the deck. that the timbers &
which may be used on the deck. and which may cross the floats
may rest exclusively on the timbers of the sides of the floats. The
planks of the deck which unite with the earlings at the trunks
are rabbited into these earlings by rabbits, two inches in width
and depth. The deck and bottom of each float are strongly spiked to the side
and end timbers of the floats and also to the ledges and earlings wherever
they come in contact with them. The ledges to which the bottom of each
float is fastened, are within about eighteen inches from centre to
centre of each other, and about as far from each other as they are from
the side timbers of the floats in reference to the spaces which separate
them. These ledges extend from end to end of the floats. and have
their ends let two inches into the end timbers of the float by a score
where they are also spiked to those timbers. The ledges to which the
deck is spiked extend from end to end of the deck of each float, and
have their ends let into the earlings at the trunks two inches by a
score where they are also spiked to these earlings. The ledges are
five inches in width by four in thickness. The ledges are supported
by earlings, to which they are also strongly spiked. The earlings
both at deck and bottom are about six feet and a half from each
other, from centre to centre along the whole extent of deck & bottom
The earlings at the wells both at deck and bottom are ten inches
square. The earlings of the deck at the pump wells have their ends
let into the side timbers of the float two inches by a score. The
upper sides of these earlings are on the same plane with the ex-
terior surface of the deck. The other earlings of both deck and
bottom have their ends let into the side timbers two inches, one
one 8109x end of each carling being chased in by a horizontal sweep, and by
means of a horizontal Mortise in these timbers. The carlings or
other than those at the wells are four inches in thickness by eight
inches in width. The carlings extend across the floats, and at
right angles with their sides and the ledges. The ledges & carlings
have their edges up and their sides perpendicular. The carlings
of the deck at the wells are two feet ten inches and a half from the
end timbers of the floats. and have their sides which front upon
the wells on the same perpendicular line with the inner side of
those sides of the trunks most remote from the ends of the floats.
The partitions which divide each float into four chambers are
strongly spiked to truss frames, made for the purpose of strength-
ening the floats. Each of these truss frames is made of two
upright timbers, eight inches thick by ten in width, extending
from plank to plank between the deck and bottom and strongly
fastened by bolts of iron of the size mentioned to the side timbers
of the float, their narrower sides being against those timbers,
and of horizontal timbers four inches thick by eight in width
which stand in the place of carlings and support the ledges as
such, which horizontal timbers are strongly spiked to and let
at each end into the upright timbers four inches by a score,
having as the other carlings their sides perpendicular. Two tim-
bers of the same dimensions with these last pass diagonally
from corner to corner of the interior of this frame crossing
each other at the centre, thereof, at which point they are let
half into each other. These timbers have their broader sides at right
angles with the horizontal timbers of the frame, and are at each of their
ends let into the upright timbers so far merely as to give them a
square shoulder against which to butt. which shoulder is at
right angles with their edges and sides. These frames are further
strengthened by perpendicular studs which are let into the horizontal
and diagonal timbers by a ship lap at the distance of about four
feet from each other, to which they are also strongly spiked.
which 8109x which truss frame is represented as it is within the interior of the float, fastened by bolts to its side timbers by the drawing marked A. The side timbers of the narrower sides of each trunk are perpendicular. Their lower ends in contact with the bottom of the float. They are strongly fastened by iron bolts of the size mentioned to the side and end timbers, and to the carlings with which they come in contact. They are contracted in their width three inches at their lower ends and as far as they pass down into the float having a horizontal shoulder of an inch and a half on each side, one of which projects over and rests on the end timbers of the float, and the other projects over and rests on the carling. The broader sides of each trunk and the partitions therein, between the pump wells and float wells are an inch and a half thick made of plank laid horizontally. The plank of each of these partitions are strongly spiked to stanchions five inches in thickness by six in width which stand perpendicularly in the pump wells, one in each corner thereof, their lower ends resting on the bottoms of the floats. which stanchions on one side of the trunk are strongly fastened to the carlings at the deck and bottom and on the other to the end timbers of the float by bolts of iron. The planks of the broader sides of each trunk are also strongly spiked to these stanchions, and to the timbers of the narrower sides of the trunk, and to the carlings and end timbers of the float. The edges of the planks of the trunk are let into the carlings at the deck and also into the end timbers of the float an inch and a half in depth and width, and their ends are let into the timbers of the narrower sides of the trunk in a rabbit an inch and a half in depth by two inches in width so that the lapping of the rabbit joint is two inches in these side timbers. Each end of each well float is about four inches thick somewhat spherical, and made of two inch planks which cross each other and are strongly nailed together. The sides of these floats are of planks an inch and a half thick which are strongly spiked to 8109x to the ends in rabbits made in these an inch and a half in
width and in depth, and also strongly spiked to frames which
are within the well floats, in each of which there are two
frames made of plank an inch and a half thick by three inches
in width, the sides of the planks of which frames are parallel
to the ends of the floats which contain them, and their edges
fit against the plank of the sides of the same floats. These frames
are at equal distances from each other and from the ends of
the floats which enclose them. The planks of the sides of these
well floats are also strongly nailed to each other from end to end
of the float at each corner thereof. The planks of the frames
within the well floats are strongly put together by halving
them into each other and by nails. The planks of the sides of
these floats are laid lengthwise with the floats and are perpen-
dicular, their ends up and down when the floats are in their wells
The well float in each well is movable up and down in its
well end foremost. A strong eye bolt of iron passes through
each well float from end to end in the centre of the ends, and is
fastened by a nut and screw at the upper end of the float, the eye
being at the lower end. The square of the exterior of the well floats
is two inches less than the square of the interior of the float wells.
A rope or chain made fast in the eye of the bolt at the lower end
of the well float passes immediately under a strong timber towards
that one of the narrower sides of the trunk which is nearest to
it, and up on the inside of the well in a groove made in each side
for it to the top of the trunk and over its top and down on the outside
about ten inches below the top where it is fastened to a cleat which
is strongly spiked to the narrower side of the trunk. The timber
under which the rope or chain passes is about fifteen inches
in width by four in thickness, its upper side is flat and hori-
zontal, its under side is rounding, its edge is parallel to the side
timbers of the float and about one inch therefrom, it is strong-
ly fastened to the end timbers of the float at one of its ends,
and 8109x and into the carling of the bottom which fronts on the wells, at
its other end by tenons two inches deep, and is within about
eight inches from the bottom of the float one of which well [illegible]
with the chain thereto passing under the timber and up the side
of the trunk and over its top, and down to the cleat on the outside
together with the said cleat and timber is represented at the
letter E, in the drawing of the dock of seven floats with a steam
boat thereon. The floats are united to each other by strong iron
links and eyebolts, at points not far distant from each of their
ends. A strong timber for the purpose of thus uniting the floats
and of affording a secure means of fastening the dock, twelve
inches in width by six inches in thickness extends across each
of the floats from outside to outside within about two feet of
each trunk and parallel thereto with its broader side hori-
zontal. It rests on the timbers of the sides of the float, the
eye bolts on which the links by which the floats are united
together, are keyed, are driven perpendicularly about where the
lines of the centre of the string timbers and of the side timbers
of the float would intersect each other, through the string-
timbers, and into the side timbers, to the depth of about six inches
in the latter, and in such a manner that the keys which pass
through the eyes of these bolts do so at right angles with the
rods of the links which they fasten. The rods of these links are
about an inch in diameter and the iron eye bolts and keys are strong
in proportion. As the floats are ranged close side by side, one end
of the link passes round an eye bolt on one float and the
other end round an eye bolt on an adjoining float which is
nearest to the former eye bolt. A strong iron key is driven through
the eye of each bolt over the link, which holds it between the
key and the string timbers and around the bolts. In this man-
ner are the floats united to each other at each end. The links
are long enough to allow the floats to be raised above or depress-
ed below each other a few inches, say [illegible] more; and the hollow
of the of the links large enough and the keys high enough above the timbers to allow the links play for this purpose, and also for the purpose of permitting the floats to pass to and fro a few inches endwise by each other. To allow the floats to play up and down by each other without straining the links, the ends of each string timber from the inner side of each eye bolt, have a gradual slope which diminishes their thick=ness at the ends of the timbers about two inches, and for the same purpose the links have an equal downward slope in from their centre towards their ends — except where the links are made long for the purpose of allowing the floats to be fastened to each other at the same distance apart from each other for the purpose of forming a dock, in which case the slope in the link should be diminished in a multiplied ratio to its increase in length. The cradle for steam boats is constructed to raise the keel of the boat about three feet above the deck of the dock The lower timbers of the cradle are twelve inches in thickness by fourteen in width, and extend only from outside to outside of each float, and rest on the side timbers of the float, and are parallel to the string timbers. one of these lower timbers is placed on each side of the centre of each float, and about three feet therefrom Two other timbers eight feet long, twelve inches thick by four-teen wide rest on these at right angles with them, one near near each side of each float. Keel chalks about eight inches square and three feet long rest on these lengthwise with them. The other lower timbers of the cradle are to support the bilge of the vessels and are of the same length and dimensions with the former and parallel thereto, and are about twelve feet from the centre of the float, one of them on each side of the centre. Timbers of the same dimensions with these, except that they are about two thirds shorter rests on these and lie lengthwise with them, and have their ends equally distant from the sides of the floats. on these again, rest bilge chalks eight inches square by three in length All 8109x All the timbers of the cradle are movable that the cradle may
be adapted to the size of the vessel, and the distance at which
the floats may be placed from each other, and have temporary
fastenings. The timbers of the cradle which are twelve inches
wide by fourteen thick, rest on their edges, having their broad-
er sides perpendicular. The lower timbers of the cradle are
slightly spiked to the side timbers of the floats, and the other
timbers of the cradle on each float are slightly spiked to each
other and fastened by spikes to those lower timbers on which
they rest. The whole of the timbers of the cradle are thus fastened
so securely that they will preserve their position beneath the
water when the dock shall be sunk for the purpose of floating
the vessel over the cradle. The dock may be sunk for the purpose
of receiving the vessel which is to be repaired on its cradle by
being allowed to fill with water to such depth as shall be neces-
sary to sink her with convenience. The water is admitted into
the dock for this purpose by holes about an inch and a half in diam-
eter, made through the bottoms of the floats. These holes are only
made in the pump wells, as a perpendicular line would describe
the same upon the bottom of the floats, and only one hole is made
in each pump well. Each of these holes is provided with a plug
by which it may be stopped, and each plug has an eye bolt
passing through its centre from end to end and strongly rivetted
at the lower end, having its eye at the upper end. A strong rod
of iron with an eye at each end stands perpendicularly in each
trunk and extends from a horizontal lever of iron which is
within about seven inches of the top of the trunk which has
an eye at that end to which the perpendicular rod is united.
This perpendicular rod in each trunk is united to the eye
bolt in the plug by the rod of the eye of the perpendicular rod
passing through the eye of the eye bolt which is in the plug. The hori-
zontal lever is united in the same manner to the upper end of
the perpendicular rod. The horizontal lever is nearly parallel
to 8109x to the broader sides of the trunk and is about half an inch
in thickness by an inch and a half in width, and plays upon
a strong iron pivot as a fulcrum, at about eight inches from
the eye of the perpendicular rod, by means of an eye made
in the lever through which the pivot passes, which is so made
as not to weaken the lever. These eyes are neatly made so that
the plug may be drawn from and returned into the holes by
the play which the rods may have, which pass thro' the eyes
respectively, and so that the pressure upon the plug when
force is applied by means of the horizontal lever to return
and hold it tight in its hole, shall be upon the centre of the
plug as nearly as may be. This fulcrum or pivot, is horizon=
tal and strongly driven into a piece of strong timber, which is
strongly spiked on and to the interior of the trunk on that side
of it which is towards the cradle. By this lever the plug may be
drawn so far as to admit the water as fast as it would enter
through a hole an inch and a half in diameter, and returned
again into the hole, and held or fastened in either position by
means of a chain which is strongly attached to the end of the
lever opposite to that which is connected to the perpendicular rod,
and which may be fastened to a cleat, which is strongly spiked to
one of the stanchions within the pump well, against which the
end last mentioned of the horizontal lever is to play, and near
the top of the well or to a pin driven horizontally in this stanchion
at such point below the top of the ~~top of the~~ well as that the end
of the lever last mentioned being, or resting upon it, will hold
the plug in the hole within the half of an inch of being drawn
therefrom. The lever is to be drawn towards the cleat and fasten
ed when it is to be held close in the hole, and to be fastened to
the pin when the water is to be admitted into the dock. The
lever is not to be allowed to pass below this pin, that the
end of the lever towards the cleat may always be a certain
means of stopping the hole, from which the pin is never
to be

8109X to be entirely drawn. The bottom of the floats where the holes
pass through them, are made five inches thick by the addition
of a plank at each hole three inches thick, and eight inches
square fitted close and tight to the bottom of the floats and
strongly spiked thereto, through the centre of which the hole
passes. Each hole on the interior of the bottom is nearly three
inches in diameter. The plug of each hole, so far as it is intend-
ed to enter the hole, has somewhat the figure of a cone reversed
that it may be easily drawn. It has also a horizontal shoulder
which projects half an inch all around it, and fits to, and upon
the bottom of the float. so as to make a tight joint between the
shoulder and the bottom. The length of the plug below the shoulder
is about four and a half inches in length. That part of the plug
which passes into the hole, fits tight but easily in the hole, as
a security against the plugs being disturbed when they should
not be, they are not allowed to pass through the bottom of the
floats, and the tops of the wells are each of them, provided
with a hatch door, hung with hinges, to this door there is
also a lock, by means of all which the wells may be entirely
closed and fastened at the top so as to prevent the plugs from
being improperly disturbed. the lower ends of the pumps rest
on the bottom of the floats — their upper ends extend to within
about a foot and a half of the tops of the trunks. The pumps
are about twelve inches in diameter; their bore is about
four inches in diameter. their spears are of iron and are about
an inch in diameter, and extend about four feet six inches
above the tops of the trunks. In each pump well. the pumps are
from centre to centre about three feet from each other. The
water is discharged from them through the sides of the
trunk on the deck of the dock by tubes. which lead from the
pumps at about a foot and ten inches below the tops of the trunks
The pumps are nearly perpendicular, they have a slight inclination at
the top towards that end of the float at which they are respect-
ively 8109x respectively placed. something more than one half of the top of each pump well is covered with a door as mentioned, and the residue of the top, with a hatch door through which the spears of the pumps pass. The upper ends of the pumps are fastened to the stanchions within the wells on that side of the trunks towards which their upper ends incline, which pumps are represented in the drawing marked B. of the profile of a float, and also in the drawing C.C. D. of the dock of seven floats at the letter D. except that the upper ends of the pumps in these drawings, improperly appear above the tops of the trunks. The pumps in each well are both worked at the same time by the same pendulum brake and by the same person. The horizontal or top lever which is connected with both spears of the pump of each well, is about four feet six inches above the tops of the trunks, where it plays on a horizontal pivot or fulcrum which has its feet on the hatch floor at the top of the pump well, to which floor its feet are strongly fastened – which horizontal lever, pendulum break and fulcrum as they are connected with the spears of the pumps and the hatch floor of the pump well, are represented in the drawing last referred to at the letter D. A horizontal platform or floor about sixteen inches wide and twelve feet in length on the outside of each trunk over the end timbers of the float, is fastened securely to each trunk about two feet below its top by spikes and supported at each end by strong timbers three inches thick by five in width, the lower ends of which are let about four inches into the end timbers of the floats at about midway of these timbers from each of their ends, which supporting timbers are strongly spiked to those end timbers and to the side of the trunk to which they form braces, as well as a support to the platform. These platforms are constructed for those to stand or walk upon who may be employed in sinking or raising the dock. The dock may 8109x may or may not require ballast to sink it, according to the weight
of the materials of which it is made. If these be much lighter than
the water in which it is to be sunk ballast will be necessary
and the weight of ballast which will be necessary will be in pro-
portion to the levity of the materials in comparison with the water
as the dock shall become saturated with water by use, the weight of
ballast necessary will be diminished. When water has been
admitted into the dock until its chambers have been nearly or
quite filled, if it shall appear by the buoyancy of the dock that
ballast will be necessary to sink it. this ballast may be then placed
on the deck of the dock, the quantity of which will be regulated by
the relative surfaces of the water within and without the dock,
ballast should be added until the surface of the water within
the dock is lower than the surface of the water in which the
dock floats. The ballast should be placed near the trunks and
be so distributed upon the dock as to preserve its deck as nearly
horizontal as may be. Previous to the application of ballast, the
holes through which the water is admitted are to be closed. When
sufficient weight of ballast has been placed on the dock, to sink
it to the depth required, by merely letting in an additional quantity
of water, the holes are opened to let in this water. As the water is
admitted, the dock will sink in the water about as fast as the
water shall rise in the chambers while those shall be filling, and then
more suddenly to about that further distance or depth, which will
make the trunks between that point up to which the water has risen
in the trunks, and that to which the trunks must sink to displace a
weight of water equal to that weight which is at that point of time
sinking the dock and afterwards again about as fast as the water
will rise in the trunks, as the same shall be permitted to enter
for this purpose through the holes and else where. When the
dock by this slow process of filling first its chambers and after-
wards its trunks as far as these shall be allowed to fill, shall
have gradually sunk with its deck sufficiently beneath the
surface 8109x surface of the water to allow the vessel which is to be raised upon it to be floated over the cradle of the dock, the holes are to be stopped with the plugs, which have been described by means of the lever and fastenings described, as prepared for this purpose by which the dock will be suspended at, and will remain at about that precise depth to which it has been thus sunk beneath the surface of the water. when the surface of the water within the trunks is lower than the surface of the water in which the trunks float, it will shew that the weight which sinks the dock is sufficient to hold her down as low as she is thus sunk, under the circum=stances of these unequal surfaces of water within and without the dock. The tops of the trunks should not be allowed to sink so near towards the surface of the water by the sinking of the dock beneath its surface, that there will not still be a reserved capacity in the trunks or that portion of them which remains above the surface of the water in which they float, as will secure them a=gainst the danger of being sunk by the waters entering them either by the holes in their sides, through which the water is to be dis=charged from the pumps, or by their upper ends or tops. This so reserved capacity will be in proportion to the additional weight of water which the trunks would still displace by the docks sink=ing deeper before the water would be admitted into them by the holes in their sides which have been mentioned which are about a foot and nine inches below their tops, or in the event of these holes being closed, by the additional weight of water the trunks would displace before the water would enter them at their tops by the docks sinking deeper. A batton marked with feet and inches of the length of the trunk is nailed perpendicu=larly on the outside of each trunk, as well as on the inside of each pump well, by which the depth of the dock beneath the surface of the water may be readily seen and also the relative surfaces of the water on the interior and exterior of the dock and trunks. The lower end of the bottom in the interior of the trunk 8109x trunks with a view to the object last mentioned extends a few inches below the lower end of the trunk and corresponding marks on the interior of the rim of the float. When the dock has been sunk to the point mentioned it may be sunk lower by letting in more water, or raised by pumping water from its chambers. The dock may also be suspended by means of the well floats in the trunks, with her deck at any depth beneath the surface of the water which may be required by making fast the chains which are attached to the lower ends of the well floats, to the cleats on the outside of the trunks leaving but such length of chain between the cleats and the eye bolts of the well floats as will cause the weight which is to sink the dock to be borne entirely by these floats when the dock shall have sunk to the required depth and thus prevent the dock from being sunk lower by such weight. So it may be allowed to sink gradually by means of the well floats by making the chain so short between the cleats to which they are fastened, and the eye bolts of the well floats, as will suspend the weight which would sink the dock to these floats, before the docks deck has sunk beneath the surface of the water, and then slacking off gradu=ally and little by little the chains from the cleats until the dock shall have gone down to the required depth. The chains may be thus slacked off from the cleats with or without the aid of a windlass which turns in the six inch timbers of each trunk near its top and projects horizontally from it about four inches around which horizontal projection, the chain of each well float is wound two or three times between the points at which it passes over the top of the trunk and that at which it is fastened to the cleat according to the first described mode of suspending the dock with its deck beneath the water at any depth required by means of the well floats, the holes in the bottoms of the floats should be closed after the chambers of the dock have been permitted to fill or nearly to fill with water until the ballast which is necessary to sink the dock shall have been placed upon it and then drawn According 8109x According to the last described mode of suspending it by the use of the well floats, the dock may be sunk and suspended to the depth required, and the ballast necessary to this end placed upon it without stopping the holes at the bottoms of the floats. That the deck of the dock may be preserved in a horizontal po=sition, while it is descending or sinking beneath the water, and while it is suspended there, the middle partition in each float is made tight, so that none of the water, which may be in either end of the float may pass into the other end; by which when one end of any float is sinking faster or lower than the other, or may be so sunk, such float may be restored to its horizontal position by closing the hole which is in its bottom at that end which is the lowest until the water has flowed into the other end sufficiently to sink it to this horizontal position, or the holes in both ends of the float being stopped, this position may be restored by discharging the water necessary therefor from the end of the float which is lowest. The well floats are tight so as to exclude water when they are sunk beneath its surface, and that they may bear up a weight equal to the weight of water which by their external dimensions they may displace, their own weight being deducted therefrom. They are strong so as to re=sist the external pressure of the water when they are sunk and to receive the force or power which is to be applied to them to sink them, at their upper end at the nut and screw. In practice, the occasion will seldom occur, when it will be necessary to remove the ballast which will be used to sink the dock. The quantity having been ascertained by the first experiments made in sinking it, may be allowed to remain upon it, near the trunks where it will not be in the way of the operations of those employd in making repairs. The dock should have, and in reference to the one described, has, so great a capacity and power in reference to its object that it may always be raised with the largest vessel in it, without removing the ballast, by pumping water from its Chambers

8109X chambers. The dock having been sunk as described, may be raised
with its deck to the surface, by pumping from its chambers about
that weight of water which is equal to the weight of the ballast
without which the dock would not have sunk, and which caused
it to sink, together with that weight of water which is equal
to that which was allowed to flow into or rise in the trunks as
necessary to permit the dock to sink the entire depth to which
its deck did sink beneath the water. So if a vessel is to be raised
upon the dock, it will be raised by pumping its weight of water
or thereabouts from the dock in addition to the weight above
mentioned, as that which would raise the dock if dis=
charged from its chambers. The principle upon which the dock
is made to rise and float is the same upon which a boat floats;
it is, that the weight of water which it displaces, is greater than
its own weight, and that which it bears. If this displacement
take place, while the dock is below the surface, it will rise to
the surface. After the deck of the dock appears at the surface
of the water a portion of the dock may be made to appear and
rise above the surface of the water about equal in dimensions
to the body of water which may be afterwards thrown from its
chambers. The floats in their decks, bottoms, trunks, sides and
ends and also the well floats are to be made tight and strong:
The former that no water may enter the dock any where below
the point to which it may be necessary to sink the dock, while
the water is being discharged therefrom or afterwards. The
latter that their highest degree of buoyancy, may be preserved
by the entire exclusion of water from their interiors, when
they are beneath the water. The dock while it is being raised
with a vessel on its cradle, and while it is made to sustain
such vessel, there should be preserved as much as possible in
a horizontal position, and also each float made to bear its
due proportion of the weight of such vessel to prevent it from
being strained. If any float, while the vessel is being so
raised

8109X raised, or afterwards, should be too low at one end, or in any way, and should be raised by discharging therefrom the water necessary to raise it on a level with its opposite side — so if any float should not afford the support which might be necessary to that part of the vessel which rests upon it, it may and should be made to afford it by displacing from its interior a weight of water equal to the additional support which such part may require — so if either end of any float should be too high, or any float should be too high in comparison with the rest, it may be depressed by letting in the water necessary for such purpose. Whilst the centre partitions in the floats are to afford the means of preserving or restoring the ends of the floats to their proper level, and consequently of holding the vessel which may be on the dock plumb — the other partitions in the floats are merely to prevent that agitation of the dock, which the greater rolling of the water in large chambers might occasion when the water in which the dock should float might be troubled. They are therefore not tight, and have scuttle holes in them, through which a man may conveniently pass, that a communication from without the dock may be had with all the chambers through the wells of the trunks and those scuttle holes, to clean the chambers, and for other purposes. The floats more remote from the boilers, and engine may often with advantage as they are placed for the purpose of forming the dock, be placed at a greater distance from each other, than th[illegible]e should be which are under the engine and boilers. Under those parts of the vessel, which are to be raised, which are light and not liable to be strained by separating the floats to some distance from each other, they may be so separated, that each float may be made to bear as nearly as may be an equal weight. When small vessels are to be raised upon floats of great capacity the floats every where under the vessel may be separated from each other to some distance, but not to such a distance as may cause 8109x cause the vessel to be strained. Links suitable in their lengths for so separating the floats from each other should be prepared and and should belong to the dock. The timbers of the cradle should be so arranged as to hold the vessel plumb which is raised thereon, and to offer it every where the requisite support. Each float has on one of its sides two strong iron eye bolts that is to say, one eye bolt in each string timber, driven securely through this timber and into the side timbers of the floats, with a strong iron ring in the eye thereof, by which the dock and each float thereof when detached may be made fast to the shore or other object. All the floats of the dock which have been described are in all respects similar to each other, and all that appertains to any one of them, appertains in the same manner to each of the others. As the downward pressure upon the dock in raising a vessel will be great, the bottom of the floats should be strong. The pressure upon the well floats will be at the nut and screws. They should be made capable of receiving the force which is to sink them at this point.

The floating dry dock for repairing steam boats and other vessels, used and known before the said improvements thereon made by the inventions of the said Thomas, may be described as an open boat generally made much after the fashion of a common scow, large enough to receive the vessel into it which is to be repaired. It is so constructed that one of its sides or ends may be opened for the purpose of admitting such vessel, and closed after the vessel shall have been so admitted. When it is used to raise a vessel, it is sunk deep enough in the water to allow the vessel to be floated into it through the opening which may be made in the end or side as mentioned, which having been done and the opening closed up the water inclosed within it, and which was admitted therein for the purpose of sinking it and also of floating the vessel into it, is then thrown out of it by the aid of pumps. The vessel which at first floated within the dock, during this process of removing the 8109x the water, gradually lowers and rests upon the cradle pre-
pared for it. after the water has been thrown out of the dock,
the vessel is in a situation in which it may be repaired.
While the dock has thus to be sunk deep enough to allow the
vessel to be floated into it and over the cradle therein
prepared, it is not allowed to sink so low that its sides or ends,
or either of them shall be entirely below the surface of the
water, inasmuch as this would prevent the water which
is in the dock from being displaced by the use of the pumps.
This dock is not provided with the means of being suspended
at any particular depth of water which would place it between
those points at which the vessel might be floated into it and the
water pumped out of it. When the water is admitted into it to
sink it for the purpose of admitting into it the vessel which
is to be raised, and when it is sunk for this purpose the weight
which will thus sink it, or may be used thus to sink it, would
probably sink it below the depth from which the water could
be thrown out of it by the use of pumps should the water be deep
enough to allow it so to sink. It is therefore only used in water
where there is a bottom or foundation, or resting place, by which
it is prevented from sinking to a depth at which its sides would
be entirely below the surface of the water. During the process of
removing the water from within the dock, it rises from its foun-
dation or resting place and floats the weight of water which has to be
pumped from the dock to raise it, is great in comparison with the weight of the
vessel which is to be raised within it, and must probably exceed this
weight in all cases very greatly beyond the amount of that weight of water,
which would be below the level of the bottom of the vessel and floated
over the cradle, and which would have to be pumped out to get under
the vessel to repair it. The sides of the dock are necessarily high,
to afford the water in which the vessel may be floated over
the cradle, and consequently excludes much of that light
which it would be desirable for the workmen to have while
repairing 8109x repairing the bottom of the vessel, and prevents the circulation of air which would be useful to dry it for the purpose of making those repairs. The workmen in making them also find themselves below the surface of the water in which the dock floats, exposed to the damp and inconvenience occasioned by leaks in the dock, leaks generally considerable from the circumstance that the dock has to be opened by a sort of gate or door which cannot be easily closed tight enough entirely to exclude the water, and also from the circumstance that the dock, as well from being large as in consequence of the nature of its construction being such as to be opened for the purpose mentioned is comparatively weak. It has no deck on or above which the vessel may be raised – no chambers from which the water may be discharged from below the vessel which is to be raised by which to elevate it above the surface of the water in which the dock floats, nor trunks, nor well floats by which to suspend the dock, nor any deck or chambers of any kind, nor partition or partitions to separate the water within the dock by which it may be kept level, or the vessel therein plumb while it is being raised, or afterwards, by discharging more water from that side or part of the dock which should be raised for the purpose of preserving it level or restoring it to that position. The said new and useful improvements invented by the said Thomas on the floating dry dock which has been herein last before described will be now designated as they constitute a part of the <u>improved</u> <u>floating</u> <u>dry</u> <u>dock</u> for repairing Steam Boats and other vessels, which has been hereinbefore described, and the said improvements more particularly described and their principles more particularly illustrated. For which purpose reference will be made to the <u>improved</u> <u>dock</u> of nine floats which has been herein before described, and to the several improvements therein invented by the said Thomas, which improvements are 1st

8109X

1st. The partitions in the said improved dock which separate the interior of each float of the dock into several chambers, by which it may be balanced and preserved
in a position sufficiently horizontal by pumping water from
one of its ends, or letting it in at the other. It is not indispensible
that the partition which in the dock of nine floats is represented to be
tight, should be so as high as the deck or connect closely with
it, inasmuch as no great inequality in the height of the ends
of the floats, in the process of raising the dock will take place
until after the water which was within the floats has been
considerably discharged, and when it will be any where near
the middle of the float, much below the deck; nor are the
other two partitions greatly important, since the carlings
would perform much of what is the object for which these
partitions are made. 2d. The deck of the improved dock,
for the purpose of raising the vessel thereon, which is to be
repaired, and of raising it above the surface of the water
and of affording to the workmen, a dry floor to work upon; -
Also for the purpose which it forms of more conveniently
giving that strength to the dock which is necessary to
preserve it from leaking - and likewise for the purpose of
forming more conveniently the chambers which are beneath the
deck, as well as for the further purposes hereinafter mentioned.
3d. The Chambers beneath the deck of the improved dock
for the purpose of admitting water therein when the dock is
to be sunk; also for the purpose of raising the dock by pumping
the water therefrom, after the holes shall have been stopped
by which the water had been admitted into the dock and
because of these chambers or a chamber in conjunction with
the trunks described and substituted for the walls or sides
of the dock, the water to be pumped from the dock, to raise
it is, relatively to the weight to be raised, greatly diminished
because also, the dock is hereby rendered stronger and less leaky 8109x leaky. 4th. The trunks of the improved dock, as a substitute
for the sides and ends or walls of the floating dry dock; the
tops of which trunks are like the sides and ends of the said
floating dry dock to remain above the water, to preserve the means
of raising the dock by pumping the water from its chamber or
chambers and as a substitute preferable to the sides or wa[illegible]
of the floating dry dock. because by such substitute, in con-
=junction with the chambers mentioned, the dock is raised
by pumping from the chambers, in addition to the water
which is in the trunks a weight of water about equal to the
weight of the vessel which is to be raised, added to that weight
by which the dock was sunk to the depth from which it is to be
raised - a weight of water, relatively to the weight to be raised
greatly less than that which has to be pumped from the float-
ing dry dock before known, relatively to the weight to be raised
in it; and because by the substitute, the vessel which is to be raised
above the surface of the water in which the dock floats, and open
spaces allowed between the several trunks : : each side of the
dock, that air may freely circulate about the vessel to dry it, and light be
fully admitted to it, by which to repair it; and also that the ends of the dock
may be allowed to be open for those purposes (see the trunks, letter E. in the
drawing before referred to, profile of a dock of seven floats, and spaces between
these trunks - see also the drawing B, - a side view of a float with
the midship of a steam boat thereon, letter C, which will show
the end of the dock in the manner in which both its ends are to
be open) This substitute of trunks for the sides of the dock is
preferable also, because by it the dock will, when sunk, pre-
sent less surface to be acted upon by the current, and because
by it the dock may be composed of many floats, and because
the trunks, while they are a substitute for the sides of the
floating dry dock, and secure as fully as sides could do, the
means of raising the dock by pumping water therefrom, -
afford also the means of suspending the dock in a horizontal position in the 8109x in the water at any depth desired by the water which they
displace or may be made to displace; and afford like=
wise a convenient place for using and protecting the well
floats, constructed for the same purpose of suspending
the dock at any depth beneath the water by the water in
which these may be made to displace; and afford also
a convenient place within which the pumps may be
protected and conveniently used.

5.th The formation of the improved dock out of several dis-
tinct floats together; by which it is more easily & cheaply
constructed, is stronger in the construction, is more man
=ageable, more convenient for use, by which the power
necessary to raise any particular vessel, whether large
or small may be employed, and no more, by using that
number of floats which will give this power, and detaching
the rest if convenience require it, by which also the dock
itself may be easily repaired, by using some of the floats as
a dock to raise others of them to repair them, and by which the
dock by detaching the floats or separating them, may be
removed into narrow inlets of the shores, or made to
occupy a narrow space at the shore to secure it against
accidents or the floating ice or drift; and by which the floats
or any number of them when not required to be used as a
dock, may be applied usefully to various other purposes-
which said improved dock however may upon, and in
conformity with, the principles of the said inventions
or some or many of them be formed of one float only or of
one or more floats with the addition of all or any of the
other inventions of the said Thomas which have been
herein enumerated and described or which may be herein=
after described or enumerated as the inventions of the
said Thomas, By composing the dock of several floats,
the [illegible] of the cradle may be more easily removed,
as 8109x as they must be removed for the purpose of repairing
every part of the vessel, inasmuch as one end of each
float may be depressed by itself by means of wedges
or otherwise to allow of such removal.

The capacity or power of the improved floating dry dock
will be nearly in proportion to the cubic feet of water which
it may contain in its chamber, or chambers if there be more
than one, that is, in that space within the interior of the
dock, which is lower than the deck and into which the water
may be admitted to sink the dock, and from which it may
be discharged by pumps to raise it. The dock will raise any
vessel which does not displace a greater quantity of water than
may be thrown from its chambers, and will not raise any
vessel that does displace more water than may be thus thrown The trunks and pumps must extend above the cradle so high
that their tops will extend above the surface of the water and
and in such manner that by their means, the water may be thrown
from the chambers, when the dock is sunk so deep that the vessel
which is to be raised may be floated over the cradle.

6th. Also the well floats which are attached to the dock as
an addition thereto, and as another mode beside that of the
trunks of suspending the dock at any depth desired beneath
the water by lengthening or shortening in the manner des-
cribed, the chain which attaches them to the dock, which
floats may be used for said purpose, either on the inside
or the outside of the trunks described, or although there should
be no trunks whatever to the dock.

Which said partitions, decks, chambers, trunks; well-
floats, and union of several floats together, to form the dock
are all and every of them new, and useful improvements
in the floating dry dock, invented by the said Thomas
for all and every of which he solicits a Patent accor-
ding to the laws of the United States in that behalf make

8109X made and provided. Done at the City of St. Louis, the 20th. of July. A.D. 1834.

Witnesses

Wilson Primm. John Thomas

W. R. Grimsley.

Exd.

W.H.C.

[10,816 words

Patented March 26. 1834

Drawing